Patented Jan. 2, 1951

2,536,753

UNITED STATES PATENT OFFICE 2,536,753

RECOVERY AND PURIFICATION OF STEROLS

Hendrik Willem Knol, Veenendaal, Netherlands, assignor to N. V. Veenendaalsche Sajet-en Vijfschachtfabriek Voorheen Wed. D. S. Van Schuppen & Zoon, Veenendaal, Netherlands No Drawing. Application September 27, 1948, Serial No. 51,489. In the Netherlands February 9, 1948

8 Claims. (Cl. 260—397.2)

This invention relates to recovery and purification of sterols, or more specifically to processes of separating sterols, such as cholesterol, from new materials containing free sterols and other unsaponifiable matter including other alcohols, wherein such new materials are admixed with zinc chloride in amount sufficient to form additive compounds with the sterols and other alcohols present, and the resulting sterol-zinc chloride addition product is separated from the other substances present in the reaction mixture, the sterol-zinc chloride addition product being then decomposed to liberate the sterol. My invention further comprises processes wherein the amount of zinc chloride used preferably amounts to from 2 to 8 moles per mole of sterol, i. e. from about four to sixteen times the amount of zinc chloride required by theory to react with the amount of sterol present in the raw material and the reaction takes place in the presence of a low boiling solvent, preferably a hydrocarbon solvent such as benzene; all as more fully set forth and as claimed.

In the past, sterols have been conventionally separated from sterol-containing raw materials by the digitonine process. This process, however, is very expensive owing to the unavoidable losses of digitonine. Another method is described in the U. S. Patent No. 2,362,605 wherein oxalic acid is reacted with a sterol containing material and the reaction product obtained is separated from the reaction mixture and then decomposed to liberate the sterol. More recently it has been suggested to use various metal salts as reagents for separating sterols from natural, or preliminarily purified materials containing sterols.

In the U. S. patent application, Serial No. 647,658, filed February 14, 1946 in the name of Overhoff et al., various inorganic salts including zinc chloride, are described as useful for separating sterols from raw materials containing the same, by a process involving the formation of metal salt-sterol addition products. These addition products are separated from the reaction mixture and the sterol is readily liberated therefrom by boiling in water.

The metal salt-sterol addition products formed in the Overhoff et al. process can be represented by the formula MX-Sterol, wherein MX represents a molecular equivalent of a metal salt. In the case of zinc chloride the corresponding addition product would have the formula $ZnCl_2(Sterol)_2$.

In the acknowledged Overhoff et al. application it is recommended that the metal salts be added to the raw materials containing free sterols in amount sufficient to react with the sterols. Best results were obtained with manganese chloride and rather inferior results with zinc chloride, a yield of only 60.6 per cent of cholesterol having a purity of 61.2 per cent being obtained by the treatment of wool grease or wool wax alcohols.

In experiments with the Overhoff et al. process I have discovered that in the case of most metal salts the use of the metal salt in excess of theoretical proportions results in the recovery of a sterol of inferior purity. I believe this to be due to the precipitation by these metal salts of insoluble addition products of the metal salts with the extraneous alcohols present in the raw materials. In the treatment of wool wax alcohols, i. e. the unsaponifiable fraction of wool grease, for example, the metal salts cause the formation of insoluble addition products of the wool wax alcohols as well as of the cholesterol present. It is then very difficult to separate the metal salt-cholesterol addition product from the addition products of the other alcohols.

I have made the surprising discovery, however, that zinc chloride is unique among the metal salts tested in that the use of an excess of zinc chloride over theoretical proportions not only increases the yield of sterol recovered in the process but produces a surprising increase in the purity of the sterol recovered. The minimum quantity of zinc chloride required to produce optimum results varies with the quantity of extraneous alcohols present in the raw material to be treated. I have found that this minimum quantity should be at least sufficient to convert all of the alcohols present, i. e. the sterol as well as extraneous alcohols, to the corresponding addition products. Fortunately an additional quantity of zinc chloride over this minimum does no harm and in the case of all the raw materials which I have tested I have found it advantageous to add at least 2 moles of zinc chloride per mole of sterol present, i. e. a quantity 4 times the theoretical as based on the sterol present. In the case of wool wax alcohols containing about 30 to 40 per cent cholesterol optimum yields and purity are obtained when from about 4 to 16 times the theoretical quantity of zinc chloride is used. I therefore prefer to employ from 2 to 8 moles of zinc chloride to 1 mole of sterol in the raw material treated.

I attribute the surprising increase of yield and purity obtained by the use of an excess of zinc chloride to the fact that the addition compounds formed between the zinc chloride and the extraneous alcohols present are soluble in organic solvents for the sterol while the excess of zinc chloride in solution causes the solubility of the relatively insoluble zinc chloride-sterol addition product to become reduced still further. It is also true that the extraneous alcohols still present after a theoretical quantity of zinc chloride has been added produce a solubilizing effect on the zinc chloride-sterol addition product. So when sufficient zinc chloride is added to convert these extraneous alcohols to their addition products this eliminates the solubilizing effect of these alcohols. In the practice of the present invention it is possible to obtain yields of sterol ranging up to 90 per cent or over with purities ranging up to 80 per cent or over.

Many advantages follow from the present invention. The reaction is completed very quickly, in the space of a few minutes. It is unnecessary to grind or powder the zinc chloride for the reaction takes place so spontaneously that technical zinc chloride can be used as such. The amount of zinc chloride need not be regulated carefully, since large excesses do no harm. All that is required is that enough be present to combine with the sterol and also to combine with any other materials present, such as alcohols, which form additive compounds with zinc chloride. The yield of sterol is increased to the extent that the other materials present, mostly wool wax alcohols, react with the zinc chloride and are thus immobilized with regard to their solubilizing effect on the sterol addition compound.

Among the further advantages flowing from the present invention there may be mentioned the fact that the reaction proceeds at least slowly at room temperature so that temperature control is not critical. And the presence of water in the reacting mixture makes no difference; hence no preliminary drying of the materials to be treated is necessary. In practicing the process the sterol containing material and the zinc chloride are simply admixed together in the presence of an organic solvent for the sterol, or, as a modification, the solvent is added after the reaction has finished. Any of the common organic solvents which dissolve sterols are operative but I find that the hydrocarbon solvents, particularly those of aromatic character are especially useful. Among the suitable liquid solvents there may be mentioned ethyl alcohol, low molecular ethers, such as dimethyl and diethyl ethers, etc., low molecular nitroparaffins, such as nitro methane, nitro ethane, nitropropanes, etc., halogenated hydrocarbons, such as trichloroethylene, dichloroethane, chloroform, etc., liquid hydrocarbons, such as gasoline, petroleum ether, benzene, toluene, iso-octane, etc. In these solvents the zinc chloride-sterol addition products are insoluble while the addition products of the extraneous alcohols, normally present in the oleaginous raw materials containing sterols, are soluble. Separation of the zinc chloride-sterol addition products is therefore very simple and may be accomplished by filtration, by centrifuging the mixture or by permitting the precipitate to settle followed by decantation of the liquid.

If desired it is possible to employ a mixed solvent. Some mixed solvents are capable of dissolving both the sterol addition product and the extraneous alcohol addition products. If the process is conducted with such a mixed solvent it is possible to produce precipitation of the sterol addition product after the reaction by distilling off one of the solvents. When a mixture of iso-octane and ethyl alcohol is used, for example, it is possible to distill off the latter azeotropically.

My process can be applied directly to any of the natural oleaginous raw materials which contain free sterols. In most of these materials, however, the sterols occur as their esters with high molecular fatty acids. In this case the sterols must be set free before the zinc chloride treatment. This can be accomplished by any of the conventional hydrolysis or saponification procedures. A treatment with an aqueous caustic alkali for example will decompose the esters and form soaps of the fatty acids. Since the latter are soluble they can be readily separated from the insoluble sterols and other unsaponifiable matter which includes hydrocarbons, dihydric alcohols, etc. It is the unsaponifiable matter which is treated with zinc chloride in accordance with the present invention. The presence of soaps or of fatty acids is detrimental to the process; hence these should be removed as completely as possible.

As mentioned above the zinc chloride treatment can be conducted if desired in the absence of extraneous solvents. In this case the reaction mixture is advantageously heated and the non-sterol matter present then melts, forming a liquid phase, and serves as a solvent. Upon cooling the reaction mixture sets to a solid but it is relatively easy to separate the zinc chloride-sterol addition product from this solid. This can be accomplished by extracting the impurities by means of one of the solvents mentioned above or by a differential solvent-solvent extraction using immiscible solvents or by any other suitable method.

It is usually more advantageous to add a sufficient amount of an inert organic solvent to dissolve the fatty material to be treated before the addition of the zinc chloride. The mixture can be heated if desired. Temperatures from about 40° to 100° are advantageous but the reaction will take place readily at room temperatures. After the zinc chloride treatment it is then merely necessary to filter or centrifuge the reaction mixture to recover the zinc-chloride-sterol addition product.

The zinc chloride-sterol addition product can be decomposed in several ways. It is merely necessary to treat it with water or with an aqueous solution, usually accompanied by heating, which will result in solution of the metal salt and liberation of the insoluble sterol. It is also possible to distill the sterol from the addition product under a vacuum. The sterol thus recovered usually contains a considerable amount of residual impurities from which it can be freed by fractionally crystallizing the sterol from a suitable solvent, such as ethyl acetate, allyl chloride or ethyl alcohol.

In order for my invention to be more fully understood I shall give tables showing the effect of temperature conditions, the influence of the reaction time, the results obtained with various solvents and the effect of varying amounts of zinc chloride. Where, in the following description I refer to the excess of zinc chloride as "fourfold", "sixfold" etc. I mean that this is four or six times (up to sixteen fold, or sixteen times) the amount of zinc chloride necessary for combining with the sterol as required by theory, as explained above, i. e. a "fourfold" excess means 2 moles of zinc chloride per mole of sterol etc.

INFLUENCE OF TEMPERATURE 25 g. wool wax alcohol with a cholesterol content of 30.8% were stirred for 30 minutes with 125 cm.$^3$ iso-octane and a sixfold excess $ZnCl_2$ (3 moles per mole of cholesterol) at different temperatures. In Table I the cholesterol content of the product obtained and the yield are shown.

Table I

| Temperature | Cholesterol | Yield |
| --- | --- | --- |
| °C. | Percent | Percent |
| 50 | 84 | 71 |
| 60 | 83 | 79 |
| 70 | 91 | 89 |
| 80 | 93 | 90 |
| 90 | 94 | 92 |
| 100 | 97 | 95 |

INFLUENCE OF TIME 25 g. of wool wax alcohols with a cholesterol content of 30.8% were stirred with 125 cm.$^3$ iso-octane and a sixfold excess $ZnCl_2$ (3 moles per mole of cholesterol) on a steam bath for different periods. In Table II the cholesterol content of the product obtained and the yield are shown in percentages.

Table II

| Time | Cholesterol | Yield |
| --- | --- | --- |
| Minutes | Percent | Percent |
| 10 | 90 | 89 |
| 20 | 93 | 89.5 |
| 30 | 97 | 93 |
| 40 | 95 | 87 |
| 50 | 95 | 88 |
| 60 | 92 | 90 |

INFLUENCE OF SOLVENTS 25 g. wool wax alcohols with a cholesterol content of 30.8% were stirred with 6–12 fold excess $ZNCl_2$ at 80–100° C. in different solvents. Table III gives the percentage of cholesterol in the product obtained and the yield in percent.

Table III

| Solvent | Cholesterol | Yield |
| --- | --- | --- |
|  | Percent | Percent |
| iso-octane | 92 | 89 |
| petroleum ether 60–80, less than 1% aromatic | 88 | 82 |
| 1% aromatic | 94 | 89 |
| 15% aromatic | 92 | 84 |
| petroleum ether 80–110, 6% aromatic | 92.5 | 85 |
| benzene | 95 | 86 |
| toluene | 85 | 71 |
| xylene | 84 | 69 |
| trichloroethylene | 99 | 77 |
| ethyl alcohol | 54 | 41 |
| ethyl ether | 85 | 52 |
| nitropropane-2 | 87 | 67 |

INFLUENCE OF THE QUANTITY OF BENZENE 25 g. wool wax alcohols with a cholesterol content of 30.8% were stirred for 60 minutes on a steam bath with an eight fold excess $ZnCl_2$ (4 moles per mole of cholesterol) and different quantities of benzene. Table IV gives the percentage of cholesterol of the product obtained and the yield in percent, when using a quantity of benzene of from three to ten times by weight of the quantity of wool wax alcohols.

Table IV

| Benzene: wool wax alcohols | Cholesterol | Yield |
| --- | --- | --- |
|  | Percent | Percent |
| 3 | 76 | 85 |
| 4 | 80 | 90 |
| 5 | 82 | 86 |
| 6 | 77 | 82 |
| 9 | 85 | 86 |
| 10 | 90 | 84 |

When different quantities of iso-octane are used and heating for one half hour with a sixfold excess $ZnCl_2$ (3 moles per mole of cholesterol) on a steam bath the results were:

Table V

| Iso-octane: Wool wax alcohols | Cholesterol | Yield |
| --- | --- | --- |
|  | Percent | Percent |
| 1 | 90 | 85 |
| 2 | 92.5 | 87.5 |
| 3 | 95 | 90 |
| 4 | 95 | 91 |
| 5 | 95 | 92.5 |
| 6 | 94 | 91 |
| 7 | 90 | 85 |

INFLUENCE OF QUANTITIES OF ZINC CHLORIDE 25 g. wool wax alcohols with a cholesterol content of 30.8% were dissolved in 225 cm.$^3$ of benzene and heated during 60 min. on a steam bath with varying quantities of zinc chloride.

Table VI

| Moles $ZnCl_2$/mole cholesterol | Cholesterol | Yield |
| --- | --- | --- |
|  | Percent | Percent |
| 1 | 80 | 12.5 |
| 2 | 86 | 77 |
| 3 | 82.5 | 80 |
| 4 | 86 | 85 |
| 5 | 92 | 86 |
| 6 | 95 | 85 |
| 7 | 89 | 83 |

Table VII

| Moles $ZnCl_2$/mole cholesterol | Cholesterol | Yield |
| --- | --- | --- |
|  | Percent | Percent |
| 1 | 65 | 51 |
| 2 | 85 | 72.5 |
| 3 | 98 | 95 |
| 4 | 95 | 95 |
| 5 | 91 | 84 |
| 6 | 91 | 84 |
| 7 | 95 | 85 |

*Example 1.*—325 g. (3 moles/mole cholesterol) of anhydrous zinc chloride ($ZnCl_2$) are added to 1000 g. wool wax alcohols with a cholesterol content of 30.8%. This mixture is heated during half an hour in a steam bath with constant stirring. After cooling the reaction mass is stirred into 5000 cm.³ iso-octane and then treated in a centrifuge. The insoluble addition product is washed by stirring in 2000 cm.³ iso-octane and then again treating in a centrifuge. By decomposition of the addition product with water 289 g. of a product are obtained containing 94.7 cholesterol corresponding with a yield of 89%.

*Example 2.*—25.0 g. of wool wax alcohols containing 30.8% cholesterol and 8.13 g. anhydrous ZnCl₂ (3 moles/mole cholesterol) are dissolved together in a mixture of 400 cm.³ benzene and 20 cm.³ alcohol. The alcohol is then removed from the solution by azeotropic distillation. After cooling the reaction mixture was treated in the same manner as described in Example 1. A yield of 6.20 g. of a product is obtained (cholesterol content 96.4%) corresponding with a percentage yield of 77.5%.

*Example 3.*—25.0 g. wool wax alcohols containing 30.7% cholesterol and 8.13 g. anhydrous ZnCl₂ (3 moles/mole cholesterol) are dissolved together in a mixture of 250 cm.³ iso-octane and 20 cm.³ alcohol. The alcohol is removed from the solution by azeotropic distillation. After cooling the reaction mixture is treated as above described. The yield is 6.83 g. of a substance (cholesterol content 94.6%) corresponding to a percentage yield of 86.8%.

*Example 4.*—A mixture of 2 g. ergosterol and 20 g. cetyl-alcohol is dissolved in 100 cm.³ iso-octane; 3 g. of anhydrous ZnCl₂ are added and the mixture is heated for half an hour on a steam bath under continuous stirring. The cooled reaction product is then treated in a centrifuge. By decomposition of the addition product with water 1.95 g. of a product are obtained containing 92% ergosterol. The yield is 90%.

*Example 5.*—The concentrated acetone extract of 10 kg. fresh bovine brain tissue is saponified in the usual manner. The unsaponifiable part is dissolved in 1000 cm.³ benzene; 600 g. anhydrous ZnCl₂ are added and the mixture is stirred for half an hour at 90° C. After cooling the reaction mixture is poured into a washtower filled with benzene. After four hours the precipitate is removed from the bottom and decomposed with water. After distilling off the benzene a yield is obtained of 320 g. cholesterol (purity 95%).

*Example 6.*—To 100 g. of the unsaponifiable part of tall oil (sterol content equals 17.7%) 40 g. anhydrous ZnCl₂ and 1000 cm.³ benzene are added. The mixture is heated on a steam bath one hour under continuous stirring. After cooling the reaction mixture is treated in a centrifuge. On decomposition of the addition product with water 36.5% of a product with 94% sitosterol are obtained. Yield 91%.

*Example 7.*—250 g. fishoil (saponification number 173.3) are saponified by boiling for two hours with a solution of 100 g. KOH (87%) in 1500 cm.³ water. The soap solution is extracted with petroleum ether whereupon the sterols dissolve in the ether. After evaporation of the petroleum ether 22.9 g. unsaponifiable substance remains with a sterol content of 24.5%. The unsaponifiable substance is dissolved in 100 cm.³ iso-octane and 6 g. anhydrous ZnCl₂ (sixfold excess) are added. The mixture is heated one hour under continuous stirring on a steam bath. After cooling the precipitate is separated off by centrifugal action, washed with 40 cm.³ iso-octane and centrifuged again. After decomposition with water 5.6 g. of a product are obtained containing 85.8% sterol, corresponding with a yield of 85.8%. If this process is repeated but with the addition of only 1 g. ZnCl₂ (the theoretical quantity) the yield is 0.1%.

*Example 8.*—400 kg. wool wax alcohols with a cholesterol content of 30.0% are dissolved in 2000 liters iso-octane. 130 kg. anhydrous ZnCl₂ (3 moles/mole cholesterol) are added and the mixture is heated for half an hour in a vessel heated by steam under continuous stirring. After cooling the reaction mixture is treated in a centrifuge. The rest is washed by once stirring in and treating in a centrifuge with 800 liters iso-octane. After decomposition of the addition product with water the solution is washed with water until it is chlorine free and the iso-octane is distilled off. 116 kg. of a product are obtained containing 98.3% cholesterol corresponding to a yield of 95%.

*Example 9.*—25.0 g. wool wax alcohols with a cholesterol content of 30.8% are dissolved in 25 cm.³ iso-octane. 8.13 g. anhydrous ZnCl₂ (3 moles/mole cholesterol) are added and the mixture is heated for half an hour on a steam bath under continuous stirring. After cooling the reaction mixture is treated in a centrifuge. The rest is washed by once stirring in and treating in a centrifuge with 50 cm.³ iso-octane. After decomposition of the addition product with water the solution is washed with water until it is chlorine free. The iso-octane is distilled off. 7.57 g. of a product are obtained containing 89.6% cholesterol corresponding to a yield of 88.0%.

*Example 10.*—25.0 g. wool wax alcohols with a cholesterol content of 30.8% are dissolved in 225 cm.³ benzene. 16.26 g. anhydrous zinc chloride (6 moles/mole cholesterol) are added and the mixture is heated for one hour at 85° C. under continuous stirring. After cooling the mixture is treated in a centrifuge, the precipitate is washed by stirring with 50 cm.³ benzene and again treated in a centrifuge. After decomposition of the addition product with water and benzene or gasoline (petrol) the solution is washed with water until it is chlorine free. The solvent is distilled off. 6.97 g. are obtained of a product containing 94.5% cholesterol corresponding to a yield of 85.5%.

*Example 11.*—25 g. wool wax alcohols with a cholesterol content of 30.8% are dissolved in 225 cm.³ benzene; 10.84 g. anhydrous ZnCl₂ (4 moles/mole cholesterol) are added and the mixture is heated for one hour to 20° C. under continuous stirring. The mixture is then treated in a centrifuge, the precipitate is washed by stirring with 50 cm.³ benzene and again treated in a centrifuge. After decomposition of the addition product with water and benzene or gasoline (petrol) the solution is washed with water until it is chlorine free. The solvent is distilled off. 7.0 g. of a product are obtained containing 95.8% cholesterol, corresponding to a yield of 87.0%.

*Example 12.*—25 g. wool wax alcohols with a cholesterol content of 30.8% are dissolved in 125 cm.³ petroleum ether 60–80 (1% aromatic); 10.84 g. anhydrous ZnCl₂ (4 moles/mole cholesterol) are added and the mixture is heated for one hour at 75° C. under continuous stirring; after cooling the mixture is treated in a centrifuge, the precipitate is washed by stirring with 50 cm.³ petroleum ether and treated again in a centrifuge. After decomposition of the addition product with water and benzene or gasoline (petrol) the solution is washed with water until it is chlorine free. The solvent is distilled off. 7.3 g. of a product are obtained containing 93.8% cholesterol corresponding to a yield of 89.0%.

It will be obvious that the processes of the present invention can be used in the isolation and recovery of sterols from many sources, for example, cholesterol from wool grease, brain and spine tissue and other materials containing free cholesterol, stigmasterol from soya beans, sitosterol from cereal grains, ergosterol from yeast and phytosterol from tall oil. And it will be apparent to those skilled in the art that many modifications fall within the purview of the present invention.

What I claim is:

1. The process of separating sterols from materials containing free sterols and other non-saponifiable matter including other alcohols, which comprises admixing such a material in liquid phase with zinc chloride, the amount thereof being at least sufficient to form addition compounds with the sterol and with the other alcohols present and amounting to from about 2 to 8 moles per mole of sterol present, separating the sterol-zinc chloride addition compound from the reaction products and decomposing the sterol-zinc chloride compound to liberate the sterol.

2. The process as in claim 1 wherein the reaction is conducted in the presence of a liquid hydrocarbon solvent.

3. The process as in claim 1 wherein the zinc chloride is added to a solution of the sterol-containing material in an organic solvent.

4. The process as in claim 1 wherein the zinc chloride added is about 3 moles per mole of sterol present.

5. In the recovery of sterols from organic raw materials containing the same at least partly in the form of their fatty esters, the process which comprises subjecting such a raw material to a hydrolyzing step, separating the hydrolytic products into a saponifiable fraction and an unsaponifiable fraction, heating the latter fraction in liquid phase with from about 2 to 8 moles of zinc chloride per mole of sterol present, thereby forming addition products with the alcohols present, separating the sterol-zinc chloride addition product from the other reaction products, decomposing the said sterol-zinc chloride addition product to form the free sterol and recovering the latter.

6. In the recovery of cholesterol from wool grease, the process which comprises subjecting wool grease to a hydrolyzing step, separating the hydrolytic products into a saponifiable fraction and an unsaponifiable fraction, mixing the latter fraction with an inert organic solvent for cholesterol, adding from about 2 to 8 moles of zinc chloride per mole of cholesterol present and heating thereby forming additive compounds of all the alcohols present, the cholesterol-zinc chloride additive compound being insoluble and the additive compounds with the other alcohols being soluble, separating the precipitate of cholesterol-zinc chloride additive compound, decomposing the latter to free the cholesterol and recovering the latter.

7. The process of claim 6 wherein the inert organic solvent is an aromatic hydrocarbon solvent.

8. The process of claim 6 wherein the reaction mixture is heated to a temperature within the range of about 40° to 100° C.

HENDRIK WILLEM KNOL.

REFERENCES CITED

The following references are of record in the file of this patent:

FOREIGN PATENTS

| Number | Country | Date |
| --- | --- | --- |
| 886,858 | France | July 19, 1943 |